(12) United States Patent  
Lee

(10) Patent No.: US 7,817,214 B2  
(45) Date of Patent: Oct. 19, 2010

(54) LIQUID CRYSTAL DISPLAY DEVICE

(75) Inventor: Baek-Woon Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 240 days.

(21) Appl. No.: 11/702,696

(22) Filed: Feb. 5, 2007

(65) Prior Publication Data

US 2007/0206125 A1 Sep. 6, 2007

(30) Foreign Application Priority Data

Feb. 6, 2006 (KR) ...................... 10-2006-0011211

(51) Int. Cl.
*G02F 1/1343* (2006.01)

(52) U.S. Cl. ....................................................... 349/38

(58) Field of Classification Search .................... 349/38
See application file for complete search history.

(56) References Cited

U.S. PATENT DOCUMENTS 7,355,666 B2 * 4/2008 Song et al. .................. 349/144

* cited by examiner

*Primary Examiner*—Jerry T Rahll  
(74) *Attorney, Agent, or Firm*—Innovation Counsel LLP

(57) ABSTRACT

A thin film transistor (TFT) array panel includes: a substrate; gate lines including gate electrodes and storage electrode lines including storage electrodes, the gate lines and the storage electrode lines being formed on the substrate; a gate insulating layer formed on the substrate; a semiconductor layer formed on the gate insulating layer; data lines and drain electrodes formed on the gate insulating layer and the semiconductor layer; storage conductors formed together with the data lines on the gate insulating layer and connected with the drain electrodes; a passivation layer formed on the data lines, the drain electrodes, and the storage conductors; and pixel electrodes formed on the passivation layer, connected with the drain electrodes, and having a plurality of cutout portions, wherein each storage electrode and each storage conductor has slant portions that overlap with the cutout portions and overlap with each other with the gate insulating layer interposed therebetween. The storage electrode and the storage conductor have the slant portions that overlap the cutout portions of the pixel electrode, thereby providing an increased aperture ratio. The horizontal component of the electric field allows the sets of cutout portions of the pixel electrode to control the direction of the liquid crystal molecules compared with conventional LCD device in which the storage electrode and the storage conductor do not have slant portions.

18 Claims, 8 Drawing Sheets

LIQUID CRYSTAL DISPLAY DEVICE

CROSS-REFERENCE TO RELATED APPLICATION

This application claims priority to and the benefit of Korean Patent Application No. 10-2006-0011211 filed in the Korean Intellectual Property Office on Feb. 6, 2006, the entire contents of which are incorporated herein by reference.

BACKGROUND OF THE INVENTION

1. Field of the Invention

The present invention relates to a liquid crystal display (LCD) device and, more particularly, to an LCD device having cutout portions.

2. Description of the Related Art

A liquid crystal display (LCD) device, one of the commonly used flat panel displays, includes two panels on which field generating electrodes such as pixel electrodes and a common electrode are formed with a liquid crystal layer interposed between the panels. A voltage is applied to the field generating electrodes to generate an electric field in the liquid crystal layer to determine the alignment of liquid crystal molecules which controls the polarization of incident light so as to display images.

Of the LCD devices, the vertically aligned (VA) mode LCD device, in which the liquid crystal molecules are arranged with their longer axes perpendicular to the display panels in the absence of an electric field, offers a high contrast ratio and wide reference viewing angle.

In order to implement a wide viewing angle in the VA mode LCD device, a method for forming cutout portions on the field generating electrodes and a method for forming protrusions on the field generating electrodes are used. The cutout portions or protrusions determine the orientation of the liquid crystal molecules. The reference viewing angle can be widened by locating the cutout portions or the protrusions in several directions to diversify the tilt direction of the liquid crystal molecules.

However, the larger the cutout portions is, the better the liquid crystal can be controlled, but so doing decreases the aperture ratio of the LCD device decreased.

SUMMARY OF THE INVENTION

According to an aspect of the invention, an exemplary embodiment is provided which widens the viewing angle without decreasing the aperture ratio the display. A thin film transistor (TFT) array panel comprises a substrate, a gate line including a gate electrode and a storage electrode line including a storage electrode formed on the substrate, a gate insulating layer formed on the gate line, the storage electrode line, and the substrate, a semiconductor layer formed on the gate insulating layer, a data line and a drain electrode formed on the gate insulating layer and the semiconductor layer, a storage conductor formed as the same layer as the data line on the gate insulating layer and connected with the drain electrode, a passivation layer formed on the data line, the drain electrode, and the storage conductor; and a pixel electrode formed on the passivation layer, connected with the drain electrode, and having a plurality of cutout portions. Each storage electrode and each storage conductor has slant portions that overlap with the cutout portions and overlaps with each other with the gate insulating layer interposed therebetween.

The width of the storage electrode and that of the storage conductor that overlap with each other may be the same, or different.

The width of the storage electrode that overlaps h the storage conductor may be larger than that of the storage conductor.

The width of the storage electrode may be larger by about 0.1 μm to about 10 μm than that of the storage conductor.

The width of the storage conductor that overlaps the storage electrode may be larger than that of the storage electrode.

The width of the storage conductor may be larger by about 0.1 μm to about 10 μm than that of the storage electrode.

Another embodiment of the present invention provides a liquid crystal display (LCD) device including a first substrate, a gate line including a gate electrode and a storage electrode line including a storage electrode formed on the first substrate, a gate insulating layer formed on the gate line, the storage line, and the substrate, a semiconductor layer formed on the gate insulating layer, a data line and a drain electrode formed on the gate insulating layer and the semiconductor layer, a storage conductor formed as the same layer as the data line on the gate insulating layer and connected with the drain electrode, a passivation layer formed on the data line, the drain electrode, and the storage conductor, and a pixel electrode formed on the passivation layer, connected with the drain electrode, and having a first cutout portion, a second substrate facing the first substrate, a common electrode formed on the second substrate and having a second cutout portion, and a liquid crystal layer interposed between the first and second substrates. The storage electrode and the storage conductor have slant portions that overlap with the cutout portions and overlap each other with the gate insulating layer interposed therebetween.

The dielectric constant ($\in$) of the liquid crystal layer, the thickness (d) of the liquid crystal layer, the dielectric constant of the passivation layer ($\in'$), and the thickness (d') of the passivation layer satisfy the relationship; $\in'd'/\in'd > 0.1$.

The second cutout portion and the first cutout portion may be alternately disposed.

The LCD device may further include a light blocking member formed on the second substrate, and a color filter formed on the second substrate and the light blocking member.

DETAILED DESCRIPTION OF THE EMBODIMENTS

Figure 1:
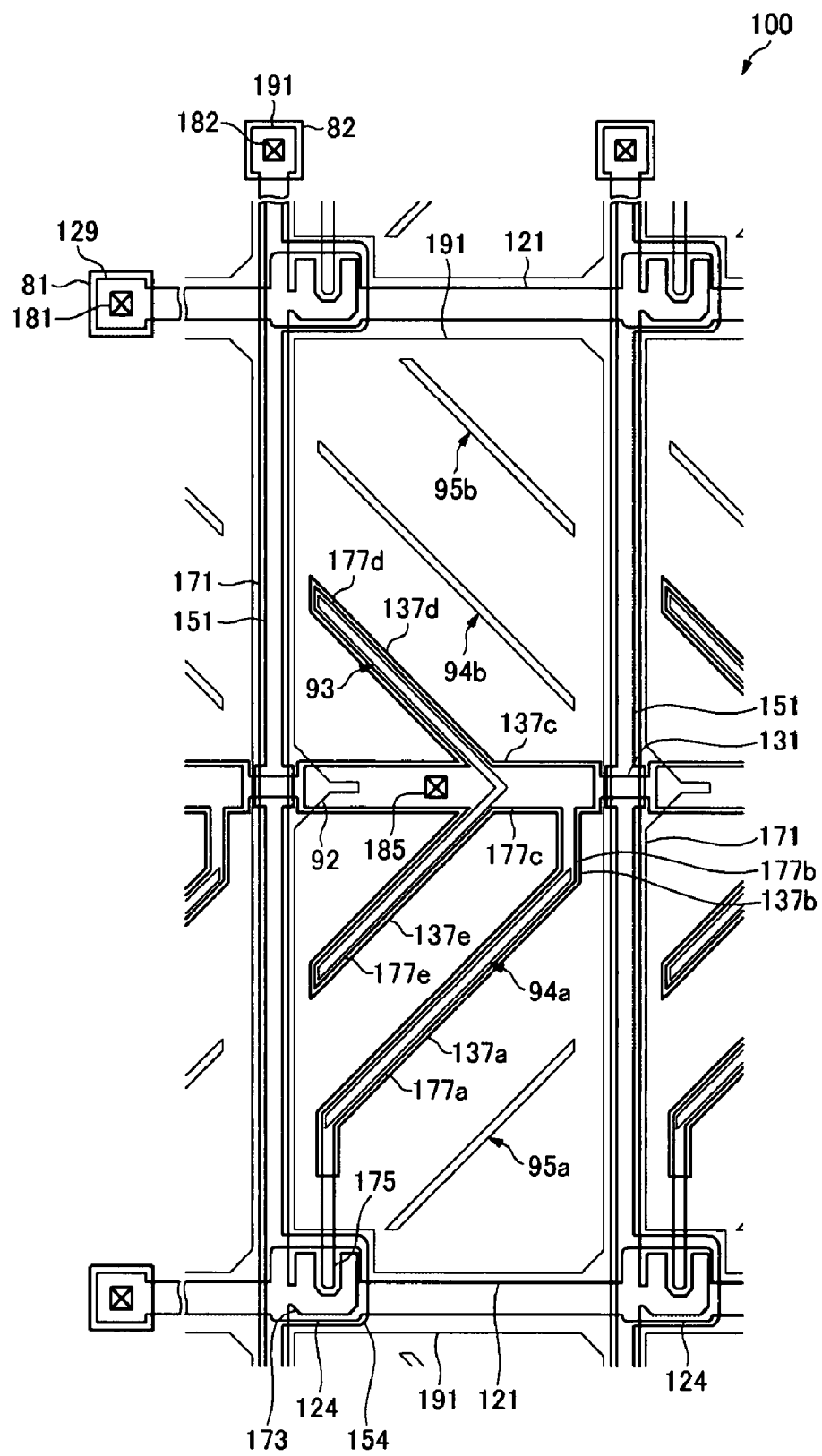
FIG. 1 is a layout view of a thin film transistor (TFT) array panel of a liquid crystal display (LCD) device according to one exemplary embodiment of the present invention.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A TFT array panel and an LCD device including the TFT array panel according to one exemplary embodiment of the present invention will now be described in detail with reference to FIGS. 1 to 3.

Figure 2:
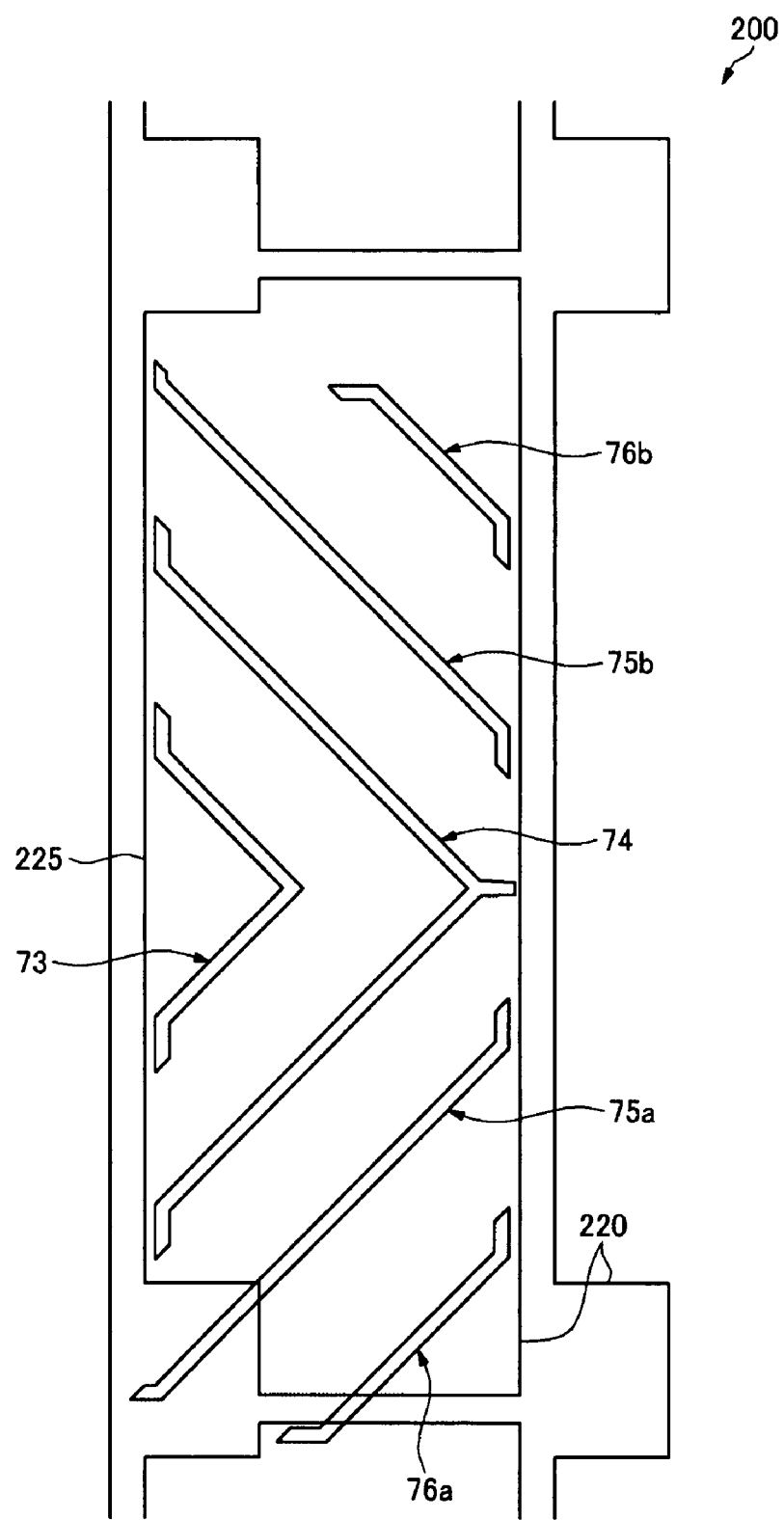
FIG. 2 is a layout view of a common electrode panel of the LCD device according to one exemplary embodiment of the present invention.
Figure 3:
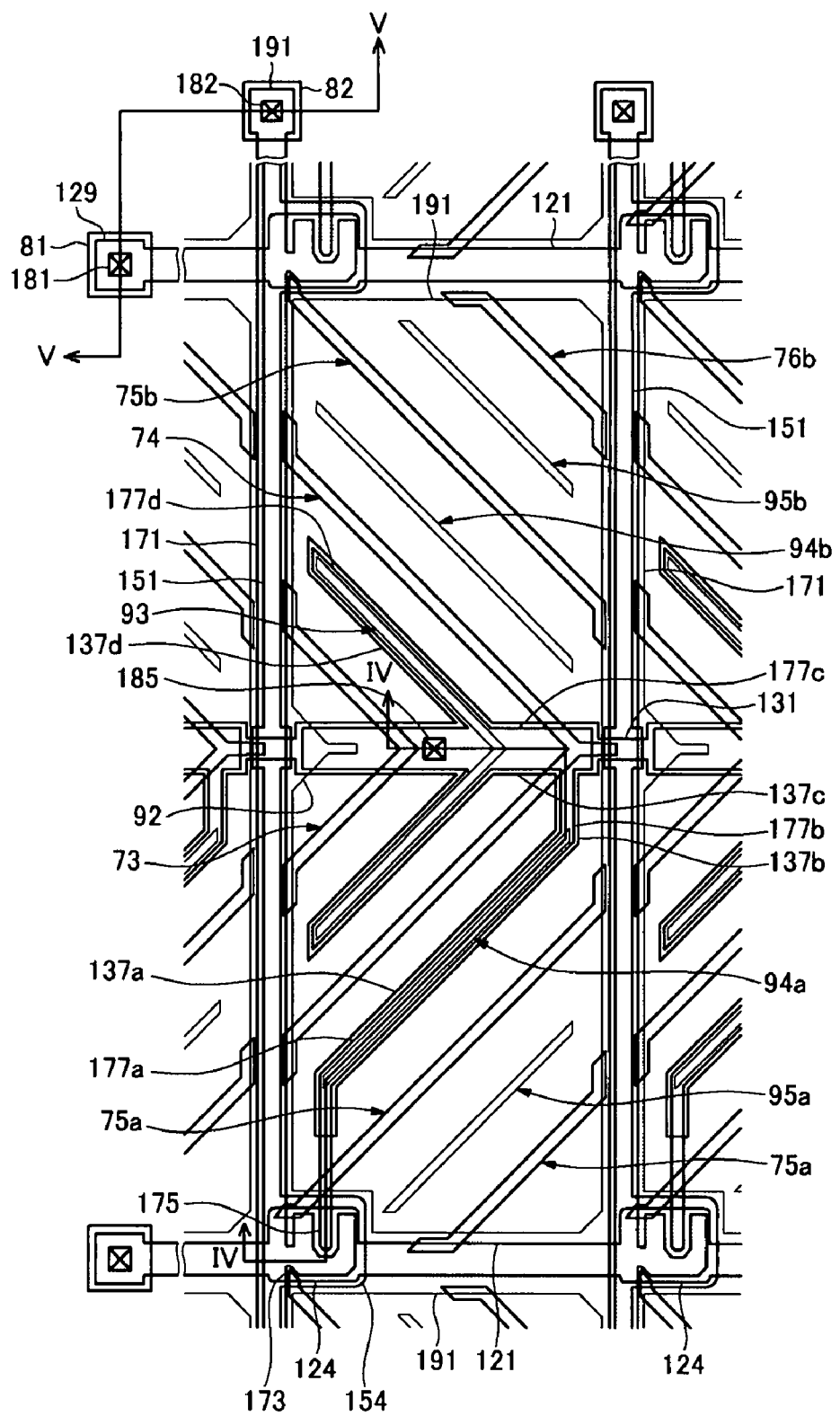
FIG. 3 is a layout view of the LCD device according to one exemplary embodiment of the present invention.

FIG. 1 is a layout view of a thin film transistor (TFT) array panel of an LCD device according to one exemplary embodiment of the present invention, FIG. 2 is a layout view of a common electrode panel of the LCD device according to one exemplary embodiment of the present invention, and FIG. 3 is a layout view of the LCD device according to one exemplary embodiment of the present invention.

The LCD device according to the present exemplary embodiment includes a thin film transistor (TFT) array panel 100 and a common electrode panel 200, and a liquid crystal layer 3 interposed between the two display panels 100 and 200.

First, the TFT array panel will be described with reference to FIGS. 1 and 3.

A plurality of gate lines 121 and a plurality of storage electrode lines 131 are formed on an insulation substrate 110 made of transparent glass or plastic.

The gate lines 121 transfer gate signals and extend mainly in a horizontal direction. Each gate line includes a plurality of gate electrodes 124 that protrude upward and a large end portion 129 for connection with a different layer or an external driving circuit. A gate driving circuit (not shown) for generating gate signals can be mounted on a flexible printed circuit film (not shown) attached on the substrate 110, directly mounted on the substrate 110, or integrated on the substrate 110. When the gate driving circuit is integrated on the substrate 110, the gate lines 121 can be elongated to be directly connected thereto.

The storage electrode line 131 receives a predetermined voltage and extends substantially parallel to the gate line 121. Each storage electrode line 131 is positioned between two adjacent gate lines 121 and is spaced apart from the two gate lines 121 at the same distance.

The storage electrode line 131 includes upwardly and downwardly extending storage electrodes 137. The storage electrodes 137 include a horizontal portion 137*c* having such a form that the storage electrode line 131 protrudes up and down, a second and a third slant portions 137*d* and 137*e* extending in upper and lower slant line directions from the horizontal portion 137*c*, a vertical portion 137*b* extending from the right side of the horizontal portion 137*c* in a vertical direction, and a first slant portion 137*a* extending slantingly from the vertical portion 137*b* in a left direction. The shape and disposition of the storage electrode line 131 can be modified in various manners.

The gate lines 121 and the storage electrode lines 131 can be made of an aluminum-based metal such as aluminum (A) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), etc. Also, the gate lines 121 and the storage electrode lines 131 can have a multi-layered structure including two conductive layers (not shown) each having different physical properties. One of the conductive layers can be made of a metal with low resistivity, such as the aluminum-based metal, the silver-based metal, or the copper-based metal, etc. in order to reduce a signal delay or a voltage drop. The other conductive layer can be made of a material such as the molybdenum-based metal, chromium, tantalum, titanium, etc., that has good physical, chemical, and electrical contact characteristics with a different material, particularly, ITO (indium tin oxide) and IZO (indium zinc oxide). Good examples of such combination may include a combination of a lower chromium layer and an upper aluminum (alloy) layer, and a combination of a lower aluminum (alloy) layer and an upper molybdenum (alloy) layer. In addition, the gate lines 121 and the storage electrode lines 131 can be made of various other metals or conductors.

The sides of the gate lines 121 and the storage electrode lines 131 are sloped to the surface of the substrate 110, and preferably, the slope angle is within the range of about 30° to 80°.

A gate insulating layer 140 made of silicon nitride (SiNx) or silicon oxide (SiOx), etc., is formed on the gate lines 121 and the storage electrode lines 131.

A plurality of semiconductor stripes 151 made of hydrogenated amorphous silicon (a-Si) or polycrystalline silicon, etc., are formed on the gate insulating layer 140. The semiconductor stripes 151 extend mainly in a vertical direction and include a plurality of projections 154 extending toward the gate electrodes 124. The semiconductor stripes 151 widen near the gate lines 121 and the storage electrode lines 131 to extensively cover them.

A plurality of ohmic contacts stripes and islands 161 and 165 are formed on the semiconductor stripes 151. The ohmic contact stripes and islands 161 and 165 can be made of a material such as n+ hydrogenated amorphous silicon in which an n-type impurity such as phosphor is doped with a high density, or silicide. The ohmic contact stripes 161 have a plurality of projections 163, and the projections 163 and the ohmic contact islands 165 are disposed as pairs on the projections 154 of the semiconductor stripes 151.

The sides of the semiconductor stripes 151 and the sides of the ohmic contact stripes and islands 161 and 165 are sloped to the substrate 110, and the slope angle is within the range of 30° to 80°.

A plurality of data lines 171, a plurality of drain electrodes 175 and a plurality of storage conductors 177 are formed on the ohmic contact stripes and islands 161 and 165.

The data lines 171 transfer data signals and extend mainly in a vertical direction to cross the gate lines 121. Each data line 171 includes a plurality of source electrodes 173 extending toward the gate electrode 124 and a large end portion 179 for a connection with a different layer or an external driving circuit. A data driving circuit (not shown) can be mounted on a flexible printed circuit film (not shown) attached on the substrate 110, directly mounted on the substrate 110, or integrated on the substrate 110. When the data driving circuit is integrated on the substrate 110, the data line 171 can be elongated to be connected thereto.

The drain electrode 175 is separated from the data line 171 and faces the source electrode 173 centering on the gate electrode 124. Each drain electrode 175 includes one bar type end portion and a storage conductor 177, and the bar type end portion is partially surrounded by a U-shaped source electrode 173.

One gate electrode 124, one source electrode 173, and one drain electrode 175 constitute a single thin film transistor (TFT) together with the projection 154 of the semiconductor stripe 151, and a channel of the TFT is formed at the projection 154 between the source electrode 173 and the drain electrode 175.

The storage conductor 177 includes a first slant portion 177a extending in a slant line direction from the bar type end portion surrounded by the source electrode 173 of the drain electrode 175, a vertical portion 177b extending from the first slant portion 177a in a vertical direction, a horizontal portion 177c extending from the vertical portion 177b in a horizontal direction, and second and third slant portions 177d and 177e extending in upper and lower slant line directions. Each portion of the storage conductor 177 overlaps a corresponding the storage electrode 137. In the present exemplary embodiment of the present invention, a width of the storage conductor 177 of the TFT array panel may be the same as or narrower than that of the storage electrode 137, and the width of the storage electrode 137 can be wider than that of the storage conductor 177 by about 0 μm to about 10 μm.

Preferably, the data lines 171, the drain electrodes 175, and the storage conductors 177 are made of a refractory metal (not shown) such as molybdenum, chromium, tantalum, titanium, etc., or their alloys, and can have a multi-layered structure including the refractory metal layer (not shown) and a low-resistance conductive layer (not shown). Examples of the multi-layered structure may include a dual-layer of a lower chromium or molybdenum (alloy) layer and an upper aluminum (alloy) layer, and a triple-layer of a lower molybdenum (alloy) layer, an intermediate aluminum (alloy) layer, and an upper molybdenum (alloy) layer. Also, the data line 171 and the drain electrode 175 can be made of various other metals or conductors.

Preferably, the sides of the data lines 171, the sides of the drain electrodes 175, and the sides of the drain electrodes 175 are also sloped to the surface of the substrate 110 at a slope angle within the range of about 30° to 80°.

The ohmic contact stripes and islands 161 and 165 exist only between the lower semiconductor stripes 151 and the upper data lines 171 and the drain electrodes 175, in order to lower contact resistance therebetween. In most portions, the semiconductor stripes 151 are narrower than the data lines 171, but as mentioned above, the semiconductor stripes 151 widen at a portion that they meet the gate lines 121 and the storage electrode lines 131 to smooth a profile of the surface to thus prevent a disconnection of the data lines 171. Some portions of the semiconductor stripes 151 including a portion between the source electrode 173 and the drain electrode 175 are exposed without being covered by the data line 171 and the drain electrode 175.

A passivation layer 180 is formed on the data lines 171 and the drain electrodes 175, and on the exposed portions of the semiconductor stripe 151. The passivation layer 180 is made of an inorganic insulator or an organic insulator, etc., and may have a planarized surface. The organic insulator may be, for example, silicon nitride or silicon oxide. The organic insulator may have photosensitivity, and its dielectric constant is preferably 4.0 or less. In this respect, the passivation layer 180 may have a dual-layered structure of a lower inorganic layer and an upper organic layer so that it may not do harm to the exposed portion of the semiconductor island 154 while still sustaining the excellent insulation characteristics of the organic layer.

On the passivation layer 180, there are formed a plurality of contact holes 182 and 185 exposing the end portions 179 of the data lines 171, and the drain electrodes 175, and on the passivation layer 180 and the gate insulating layer 140, there are formed a plurality of contact holes 181 exposing the end portions 129 of the gate lines 121.

A plurality of pixel electrodes 191 and a plurality of contact assistants 81 and 82 are formed on the passivation layer 180. The pixel electrodes 191 and the contact assistants 81 and 82 can be made of a transparent conductive material such as ITO or IZO, or a reflective metal such as aluminum, silver, chromium, or their alloys.

The pixel electrode 191 is physically and electrically connected with the drain electrode 175 via the contact hole 185 and receives a data voltage from the drain electrode 175. The pixel electrode 191, to which the data voltage has been applied, generates an electric field together with a common electrode 270 of the common electrode panel 200 which receives a common voltage, to thereby determine the orientation direction of the liquid crystal molecules (not shown) of the liquid crystal layer 3. The polarization of light transmitted through the liquid crystal layer 3 differs depending on the orientation direction of the liquid crystal molecules. The pixel electrode 191 and the common electrode 270 form a capacitor (referred to hereinafter as a 'liquid crystal capacitor') to sustain the applied voltage even after the TFT is turned off.

As mentioned, the storage conductor 177 overlaps the storage electrode line 131 including the storage electrode 137. A capacitor formed as the storage conductor 177 electrically connected with the pixel electrode 191 overlaps with the storage electrode line 131 is called a storage capacitor, which strengthens voltage storage capability of the liquid crystal capacitor. In the exemplary embodiment of the present invention, the storage electrode 137 and the storage conductor 177 overlap each other to form the storage capacitor of the TFT array panel. Slant portions 137a, 137d, 137e, 177a, 177d, and 177e are disposed below cutout portions 92, 93, 94a, 94b, 95a, and 95b of the pixel electrode. The width of the slant portions 137a, 137d, 137e, 177a, 177d, and 177e is preferably the same as that of the cutout portions 92, 93, 94a, 94b, 95a, and 95b of the pixel electrode.

Each pixel electrode 191 has four major edges substantially parallel to the gate lines 121 and the data lines 171, and has a substantially rectangular shape with chamfered corners. The chamfered hypotenuse of the pixel electrode 191 makes an angle of about 45° with the gate line 121.

The cutout portions of the pixel electrodes 191 includes central cutout portions 92 and 93, the lower cutout portions 94a and 95a, and upper cutout portions 94b and 95b. The pixel electrodes 191 are divided into a plurality of partitions by these cutout portions 92~95b. The cutout portions 92~95b are substantially symmetrical to a virtual horizontal central line that divides each pixel electrode 191.

The upper and lower cutout portions 94a~95b extend substantially from the right and upper hypotenuses of the pixel electrode 191 to the right hypotenuse slantingly, and are positioned at the upper and lower portions of the pixel electrode 191 based on the horizontal central line of the pixel electrode 191. The upper and lower cutout portions 94a~95b extend vertically at an angel of about 45° to the gate lines 121.

The central cutout portion 92 is disposed at the center of the pixel electrode 191 and has an entrance positioned at the left side thereof. The entrance of the central cutout portion 92 has a pair of hypotenuses substantially parallel to the lower and upper cutout portions 94a, 95a, 94b, and 95b. The central cutout portion 93 includes a pair of slant portions extending slantingly from the horizontal central line of the pixel electrode 191 to the left side of the pixel electrode 191.

Accordingly, the lower portion of the pixel electrode 191 is divided into four parts by the central cutout portion 93 and the lower cutout portions 94a and 95a, and the upper portion of the pixel electrode 191 is divided into four parts by the central cutout portion 93 and the lower cutout portions 94a and 95a.

The number of regions or the number of cutout portions may vary depending on the designing factors such as the ratio of the length of the horizontal side and vertical side of the pixel electrode 191 and type or characteristics of the liquid crystal layer 3.

Among the cutout portions 92a~95b, the central cutout portion 93 and the lower cutout portion 94a overlap the first to third slant portions 177a, 177d, and 177e of the storage conductor 177 and the slant portions of the storage electrode 137.

In this manner, by forming the storage electrode 137 and the storage conductor 177 such that they overlap the cutout portions 92, 93, 94a, 94b, 95a, and 95b, the aperture ratio of the LCD device can be improved.

The contact assistants 81 and 82 are connected with the end portions 129 of the gate lines 121 and the end portions 179 of the data lines 171 via the contact holes 181 and 182. The contact assistants 81 and 82 assist the adhesion of the end portions 129 of the gate lines 121 and the end portions 179 of the data lines 171 with an external device, and protect them.

In the LCD device according to the exemplary embodiment of the present invention, when the dielectric constant of liquid crystal is "∈", the cell gap of the LCD device is "d", the dielectric constant of the passivation layer 180 is "∈'", and the thickness of the passivation layer 180 is "d'", it is preferred that the relationship ∈d'/∈'d>0.1 be satisfied.

Figure 4:
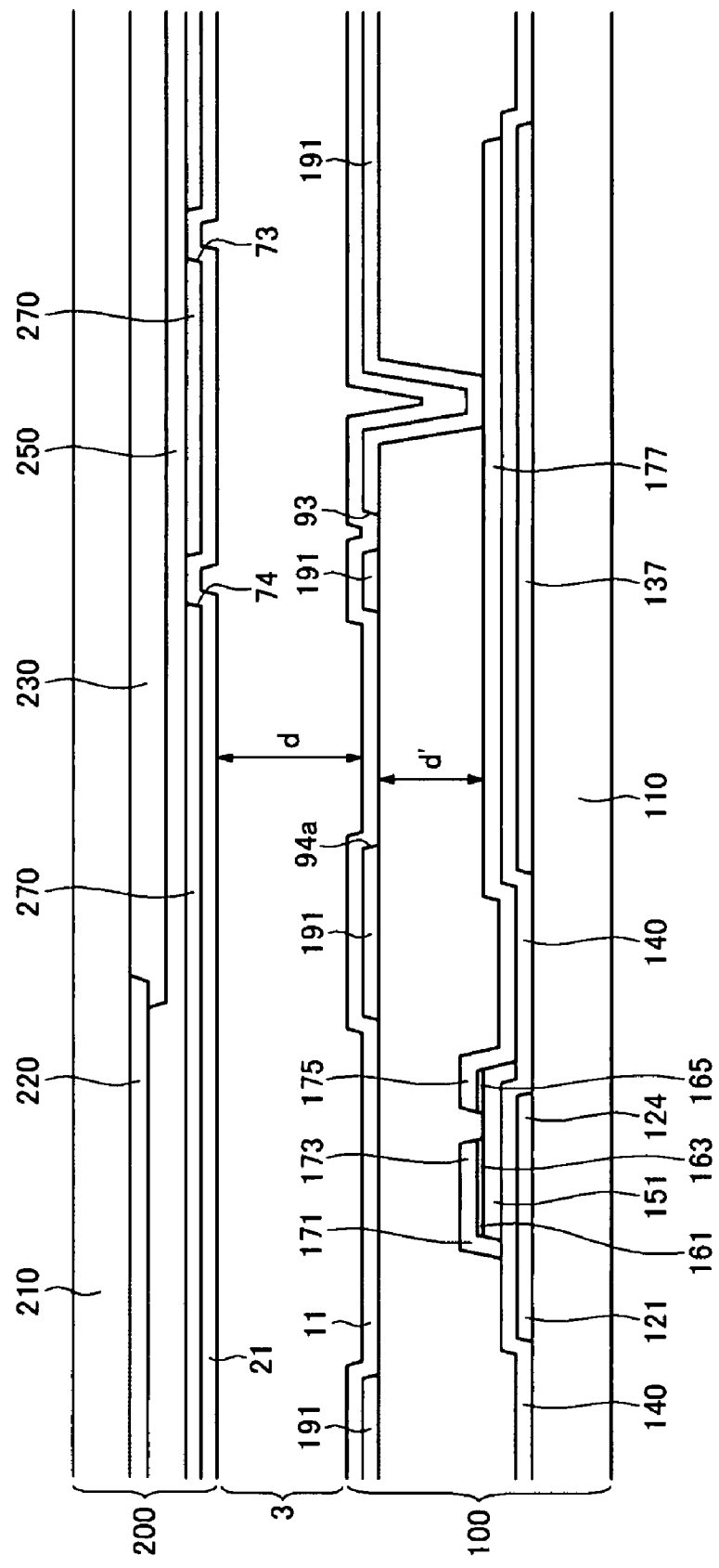
FIG. 4 is a cross-sectional view taken along line IV-IV of the LCD device in FIG. 3.
Figure 5:
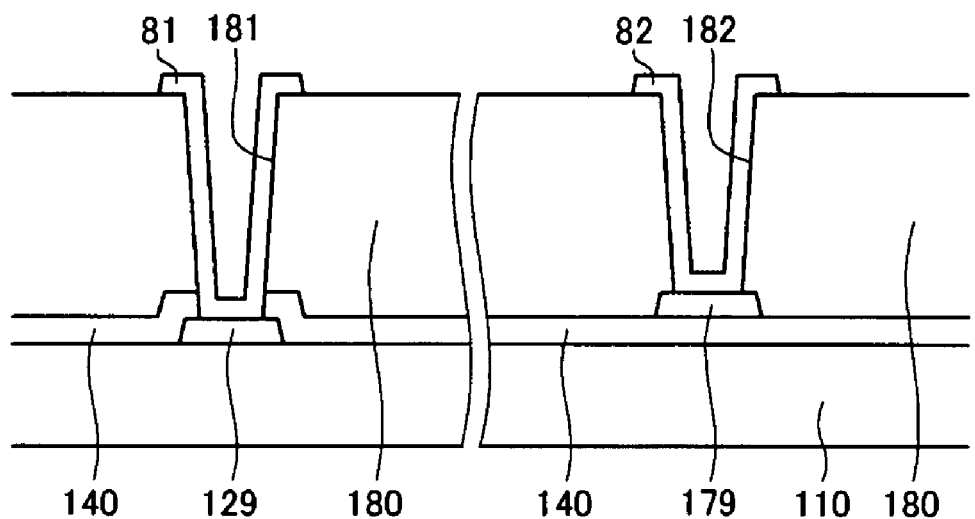
FIG. 5 is a cross-sectional view taken along line V-V of the LCD device in FIG. 3.

The common electrode panel 200 will now be described with reference to FIGS. 2 to 4.

A light blocking member 220 is formed on the insulation substrate 210 made of transparent glass or plastic. The light blocking member 220 is also called a black matrix and prevents light leakage. The light blocking member 220 faces the pixel electrode 191, has a plurality of openings 225 with substantially the same shape as the pixel electrode 191, and blocks light leakage between pixel electrodes 191. The light blocking member 220 may include a portion corresponding to the gate line 121 and the data line 171 and a portion corresponding to the TFT.

A plurality of color filters 230 are also formed on the substrate 210. The color filters 230 exist mostly within regions surrounded by the light blocking member 230, and may extend long in a vertical direction along the rows of pixel electrodes 191. Each color filter 230 can display one of three primary colors of red green, and blue.

An overcoat 250 is formed on the color filters 230 and the light blocking members 220. The overcoat 250 can be made of an (organic) insulator to protect the color filters 230, to prevent the color filters 230 from being exposed, and to provide a planarized surface.

A common electrode 270 made of a transparent conductor such as ITO or IZO is formed on the overcoat 250.

The common electrode 270 has sets of a plurality of cutout portions 73, 74, 75a, 75b, 76a, and 76b.

One set of cutout portions 73~75b face a single pixel electrode 191 and include central cutout portions 73 and 74, lower cutout portions 75a and 76a and upper cutout portions 75b and 76b. The cutout portions 73, 74, 75a, 76a, 75b, and 76b are disposed between adjacent cutout portions 92~95b or between cutout portions 94a~95b and the chamfered hypotenuse. The cutout portions 73~75b include at least one slant portion extending parallel to the lower cutout portions 94a and 95a or the upper cutout portions 94b and 95b of the pixel electrode 191, and each slant portion includes a concave notch. The notches of the cutout portions 73~75b of the common electrode 270 determine a slant direction of liquid crystal molecules positioned at the cutout portions 73~75b. The notches can be formed at the cutout portions 92~95b of the pixel electrode 191 or omitted.

The lower and upper cutout portions 75a, 75b, 76a, and 76b include a slant portion, a horizontal portion, and a vertical portion. The slant portion extends substantially from the upper or lower side of the pixel electrode 191 to the right side. The horizontal and vertical portions overlap with the sides of the pixel electrode 191 and extend from each end of slant portions, and form an obtuse angle to the slant portions.

The central cutout portions 73 and 74 include a central horizontal portion, a pair of slant portions, and a pair of end vertical portions. The central horizontal portion extends substantially from the right side or the center of the pixel electrode 191 to the left side along the horizontal central line of the pixel electrode 191, and the pair of slant portions extend substantially from an end of the central horizontal portion toward the left side of the pixel electrode 191 so as to be substantially parallel to the lower and upper cutout portions 75a and 75b. The end vertical portions extend from ends of the corresponding slant portions while overlapping with the right side along the right side of the pixel electrode 191, and form an obtuse angle to the slant portion.

The number of the cutout portions 73~75b can vary depending on design factors, and the light blocking member 220 and the cutout portions 73~75b can overlap with each other to prevent light leakage at or around the cutout portions 73~75b.

Alignment layers 11 and 21 are coated on an inner surface of the display panels 100 and 200, and can be vertical alignment layers. Polarizers (not shown) are provided on an outer surface of the display panels 100 and 200, and polarization axes of the two polarizers are perpendicular to each other, and preferably, one of the two polarization axes is parallel to the gate lines 121. In the case of a reflective LCD device, one of the two polarizers can be omitted.

The LCD device according to the present exemplary embodiment of the present invention may further include a phase retardation film (not shown) for compensating delay of the liquid crystal layer. The LCD device may further include a backlight unit (not shown) for providing light to the polarizers, the phase retardation film, the display panels 100 and 200, and the liquid crystal layer 3.

The liquid crystal layer 3 has negative dielectric anisotropy, and liquid crystal molecules of the liquid crystal layer 3 are aligned such that their longer axes are substantially perpendicular to the surfaces of the two display panels 100 and 200 in a state when there is no electric field. Accordingly, incident light is blocked, rather than passing through the crossed polarizers.

When a common voltage is applied to the common electrode and a data voltage is applied to the pixel electrode 191, an electric field substantially perpendicular to the surface of the display panels 100 and 200 is generated. Then, the longer axis of the liquid crystal molecules is changed to be perpendicular to the direction of the electric field in response to the electric field. Hereinafter, the pixel electrode 191 and the common electrode 270 will be called field generating electrodes.

The cutout portions 73~75b and 92~95b of the field generating electrodes 191 and 270 and the sides of the pixel electrode 191 distort the electric field to create a horizontal component for determining a slant direction of the liquid crystal molecules. The horizontal component of the electric field is substantially perpendicular to the sides of the cutout portions 73~75b and 92~95b and the sides of the pixel electrode 191.

With reference to FIG. 3, a set of cutout portions 73~75b and 92~95b divide the pixel electrode 191 into a plurality of sub-regions, and each region has two major edges making an oblique angle to a major edge of the pixel electrode 191.

Liquid crystal molecules on each sub-region mostly incline to be perpendicular to the major edges, namely, substantially in four directions. By varying the directions in which the liquid crystal molecules incline, a reference viewing angle of the LCD device can increase.

At least one or more cutout portions 73~75b and 92~95b can be substituted by protrusions (not shown) or depressions (not shown). The protrusions can be made of an organic material or an inorganic material, and can be disposed on an upper or lower portion of the field generating electrodes 191 and 270.

In the present exemplary embodiment of the present invention, a storage conductor 177, to which the same voltage as that of the pixel electrode is applied, is disposed at lower portions of some of the sets of cutout portions 92~95b of the pixel electrode 191 of the TFT array panel.

Where the storage conductor 177 to which a voltage is applied is located at the lower portions of the sets of cutout portions 92~95b of the pixel electrode 191, the following relational expression should be satisfied in order to create an electric field horizontal component having a magnitude that can control the direction in which the liquid crystal molecules incline:

$$V_{SC} < V_P(1+\in d'/\in' d),$$

where, $V_{SC}$ is the voltage applied to the storage conductor 177, $V_P$ is the voltage applied to the pixel electrode 191, "∈" and "d" are a dielectric constants of the liquid crystal and the cell gap, respectively, and "∈'" and "d'" are the dielectric constant and thickness of the passivation layer 180.

A TFT array panel according to the present exemplary embodiment of the present invention applies the same data voltage to the storage conductor 177 and the pixel electrode 191, so that $V_{SC}$ and $V_P$ are the same and ∈d'/∈'d>0.1, and thus, the above formula is satisfied.

In the TFT array panel according to the present exemplary embodiment, the storage electrode 137 and the storage conductor 177 have the slant portions with the same width as the cutout portions and are disposed below the cutout portions 92~95b Accordingly, the aperture ratio of the LCD device is increased. The horizontal component of the electric field allows the sets of cutout portions 92~95b of the pixel electrode 191 to control the direction in which the liquid crystal molecules are oriented compared with a conventional LCD device in which the storage electrode 137 and the storage conductor 177 are not disposed below the cutout portions 92~95b.

The LCD device according to another exemplary embodiment of the present invention will now be described in detail with reference to FIGS. 6 to 8.

Figure 6:
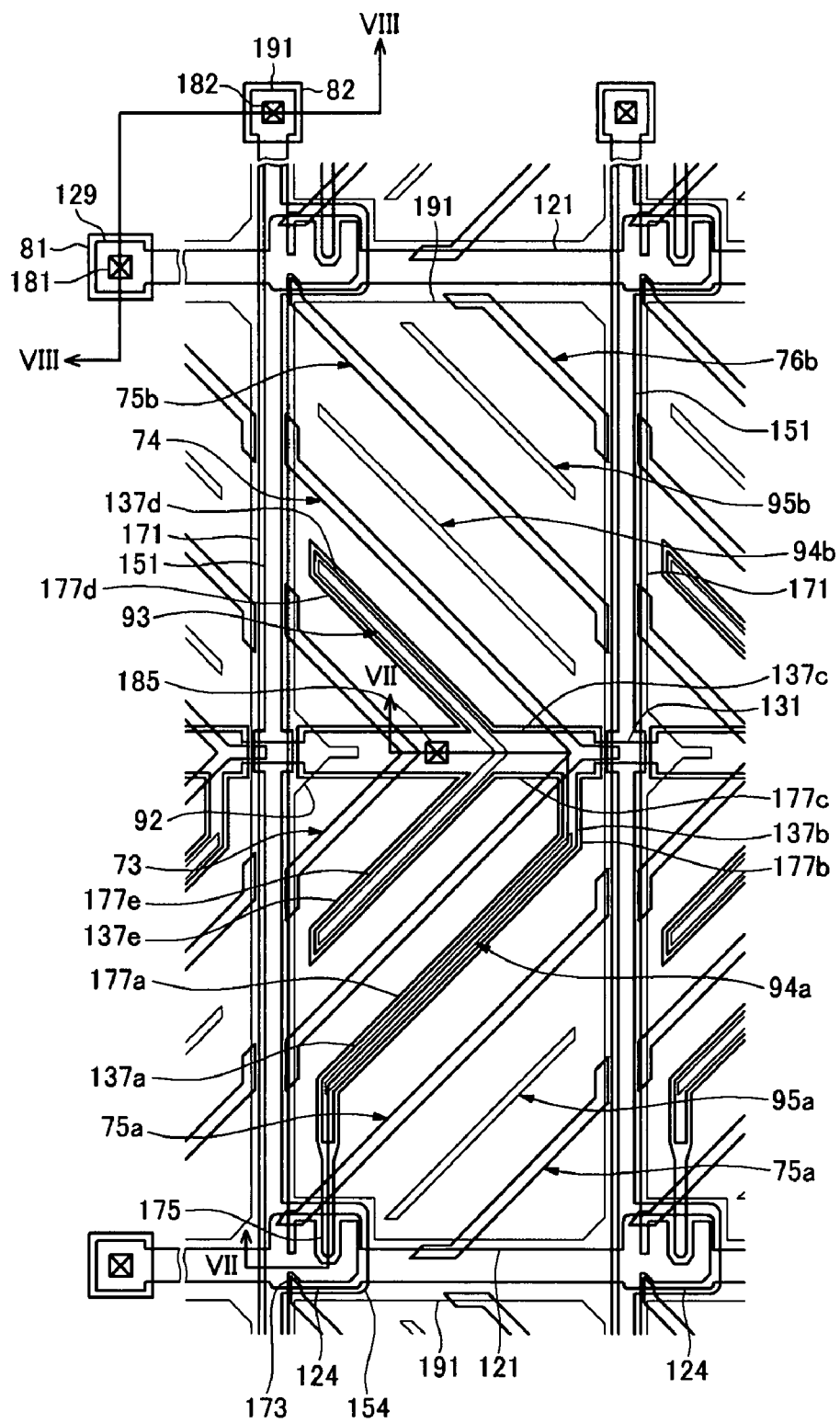
FIG. 6 is a layout view of an LCD device according to another exemplary embodiment of the present invention.
Figure 7:
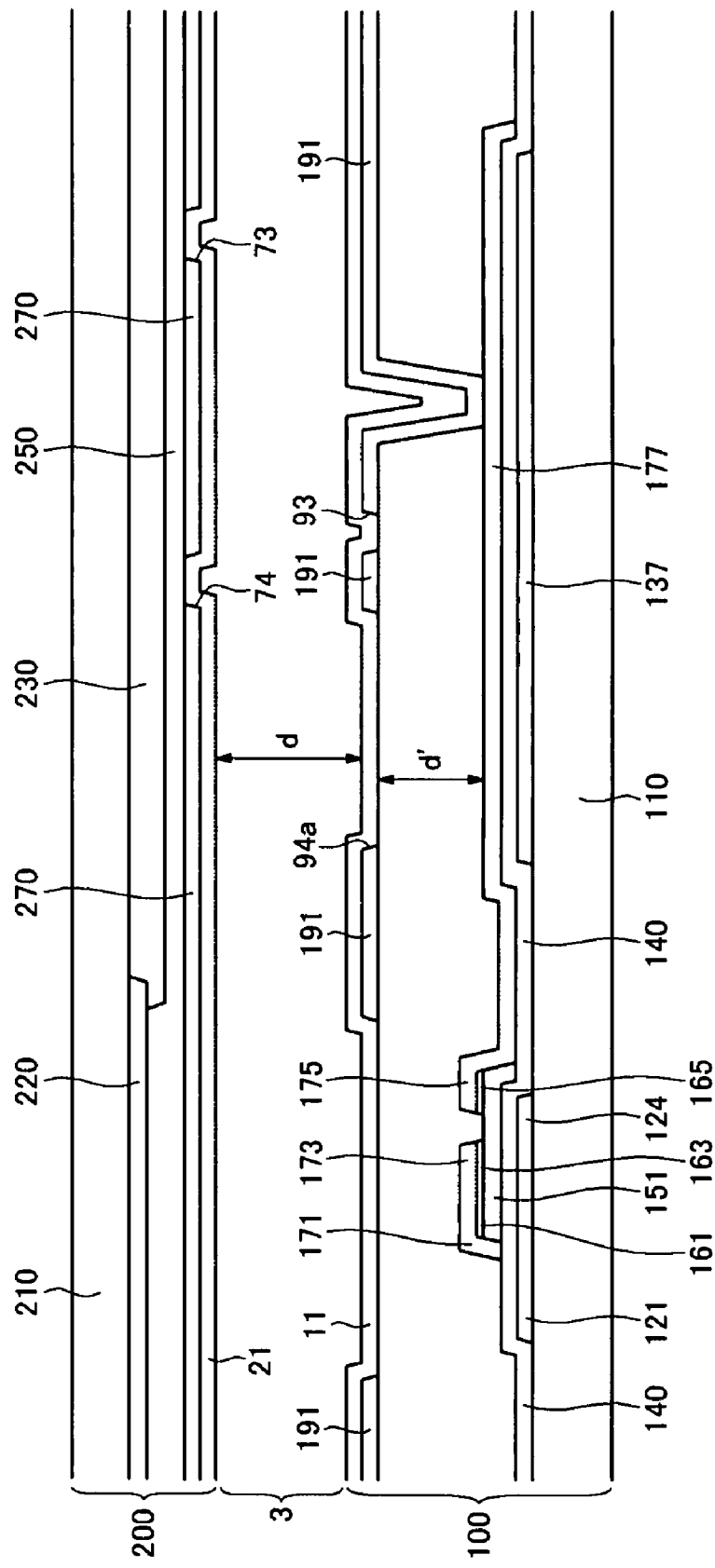
FIG. 7 is a cross-sectional view taken along line VII-VII of the LCD device in FIG. 6.
Figure 8:
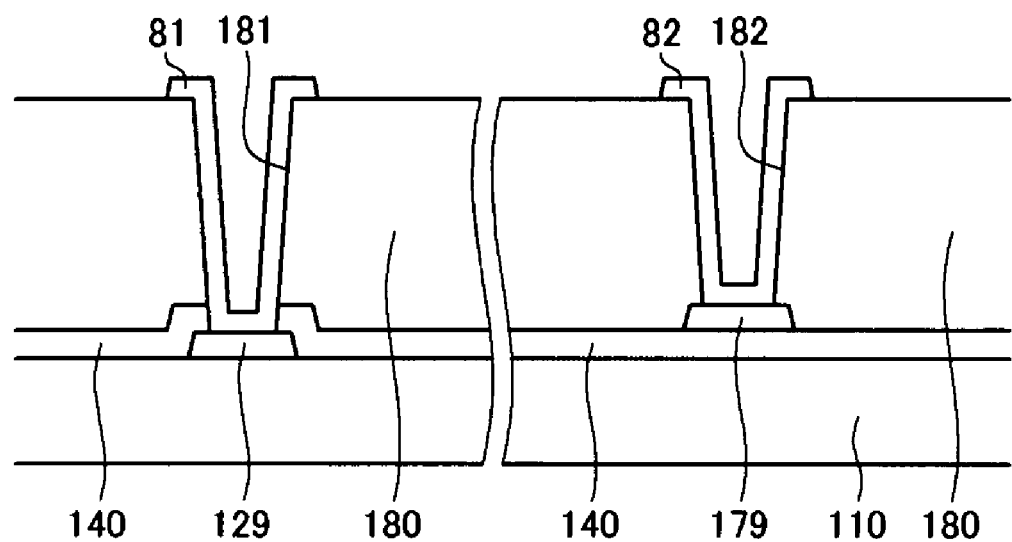
FIG. 8 is a cross-sectional view taken along line VIII-VIII of the LCD device in FIG. 6.

FIG. 6 is a layout view of an LCD device according to another exemplary embodiment of the present invention, FIG. 7 is a cross-sectional view taken along line VII-VII of the LCD device in FIG. 6, and FIG. 8 is a cross-sectional view taken along line VIII-VIII of the LCD device in FIG. 6.

The LCD device according to the present exemplary embodiment includes a TFT array panel 100, a common electrode panel 200, and a liquid crystal layer 3 interposed between the two display panels 100 and 200.

The layered structures of the display panels 100 and 200 are substantially the same as those shown in FIGS. 1 to 5.

In the TFT array panel, a plurality of gate lines 121 including gate electrodes 124 and a plurality of storage electrode lines 131 including storage electrodes are formed on a substrate 110, on which a gate insulating layer 140, a plurality of semiconductor stripes 151 including projections 154, a plurality of ohmic contact stripes 161 including projections 163, and a plurality of ohmic contact islands 165 are sequentially formed.

A plurality of data lines 171 including source electrodes 173 and a plurality of drain electrodes 175 are formed on the ohmic contact stripes and islands 161 and 165, a storage conductor 177 is formed as the same layer as the data lines 171 and connected with the drain electrode 175, and a passivation layer 180 is formed thereon. A plurality of contact holes 181, 182, and 185 are formed at the passivation layer 180, on which a plurality of pixel electrodes 191, a plurality of contact assistants 81 and 82, and an alignment layer 11 are formed.

In the common electrode panel 200, a light blocking member 220, a plurality of color filers 230, a common electrode, and an alignment layer 21 are sequentially formed on an insulation substrate 210.

However, unlike the LCD device shown in FIGS. 1 to 5, in the LCD device according to another exemplary embodiment of the present invention, the width of the storage electrode 137 may be the same as or narrower than that of the storage conductor 177 and the width of the storage conductor 177 may be larger than that of the storage electrode 137 by about 0 μm to about 10 μm.

In the LCD device according to the present exemplary embodiment, the storage electrode 137 and the storage conductor 177 also have slant portions overlapping cutout portions 92~95b. When the dielectric constant of the liquid crystal is "E", the cell gap of the LCD device is "d", the dielectric constant of the passivation layer 180 is "∈'", and the thickness of the passivation layer 180 is "d'", the relationship ∈d'/∈'d>0.1 is satisfied.

Accordingly, because the storage electrode 137 and the storage conductor 177 have the slant portions that overlap the cutout portions 92~95b of the pixel electrode 191, the aperture ratio of the LCD device is increased and the electric field horizontal component allows the sets of cutout portions 92~95b of the pixel electrode 191 to control the direction in which the liquid crystal molecules are inclined, compared with the conventional LCD device in which the storage electrode 137 and the storage conductor 177 are not disposed below the cutout portions 92~95b.

As described above, because the TFT array panel of the LCD device according to the exemplary embodiments of the present invention includes the storage electrode and the storage conductor having the slant portions that overlap the cutout portions of the pixel electrode, the aperture ratio of the LCD device is increased compared with the conventional LCD device in which the storage electrode and the storage conductor do not have the slant portions.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A thin film transistor (TFT) array panel comprising:
a substrate;
a gate line comprising a gate electrode disposed on the substrate;
a storage electrode line comprising a storage electrode disposed on the substrate;
a gate insulating layer disposed on the gate line, the storage electrode line, and the substrate;
a semiconductor layer disposed on the gate insulating layer;
a data line and a drain electrode disposed on the gate insulating layer and the semiconductor layer;
a storage conductor disposed as the same layer as the data line on the gate insulating layer and connected with the drain electrode;
a passivation layer disposed on the data line, the drain electrode, and the storage conductor; and
a pixel electrode disposed on the passivation layer, connected with the drain electrode, and comprising a plurality of cutout portions,
wherein the storage electrode and the storage conductor comprise correspondingly shaped slant portions that overlap the cutout portions and overlap each other with the gate insulating layer interposed therebetween, and
wherein the slant portion of the storage conductor and the slant portion of the storage electrode extend along each other.

2. The panel of claim 1, wherein a width of the storage electrode and that of the storage conductor that overlap each other are substantially the same.

3. The panel of claim 1, wherein the width of the storage electrode and that of the storage conductor that overlap each other are different.

4. The panel of claim 3, wherein the width of the storage electrode that overlaps the storage conductor is larger than the width of the storage conductor.

5. The panel of claim 4, wherein the width of the storage electrode is wider by about 0.1 µm to about 10 µm than the width of the storage conductor.

6. The panel of claim 3, wherein the width of the storage conductor that overlaps the storage electrode is wider than the width of the storage electrode.

7. The panel of claim 6, wherein the width of the storage conductor is wider by about 0.1 µm to about 10 µm than the width of the storage electrode.

8. The panel of claim 1, wherein the cutout portion extends along the slant portion of the storage electrode and the storage conductor.

9. The panel of claim 1, wherein the storage conductor further comprises a horizontal portion parallel to the gate line and connects with the slant portion of the storage conductor.

10. A liquid crystal display (LCD) device comprising:
a first substrate,
a gate line comprising a gate electrode disposed on the first substrate;
a storage electrode line comprising a storage electrode disposed on the first substrate;
a gate insulating layer disposed on the gate line, the storage electrode line, and the substrate;
a semiconductor layer disposed on the gate insulating layer;
a data line and a drain electrode disposed on the gate insulating layer and the semiconductor layer;
a storage conductor disposed as the same layer as the data line on the gate insulating layer and connected with the drain electrode;
a passivation layer disposed on the data line, the drain electrode, and the storage conductor; and
a pixel electrode formed on the passivation layer, connected with the drain electrode, and comprising a first cutout portion;
a second substrate facing the first substrate; a common electrode formed on the second substrate and comprising a second cutout portion; and
a liquid crystal layer interposed between the first and second substrates,
wherein the storage electrode and the storage conductor comprise corresponding shaped slant portions that overlap the cutout portions and overlap each other, with the gate insulating layer interposed therebetween,
wherein the slant portion of the storage conductor and the slant portion of the storage electrode extend along each other.

11. The device of claim 10, wherein the widths of the storage electrode and that of the storage conductor that overlap each other are different.

12. The device of claim 11, wherein the width of the storage electrode is wider by about 0.1 µm to about 10 µm than the width of the storage conductor.

13. The device of claim 11, wherein the width of the storage conductor is wider by about 0.1 µm to about 10 µm than the width of the storage electrode.

14. The device of claim 10, wherein the second cutout portion and the first cutout portion are alternately disposed.

15. The device of claim 10, further comprising: a light blocking member formed on the second substrate; and a color filter formed on the second substrate and the light blocking member.

16. The device of claim 10, wherein the storage electrode and the storage conductor have branches.

17. The device of claim 10, wherein the dielectric constant ($\in$) of the liquid crystal layer, the thickness (d) of the liquid crystal layer, the dielectric constant of the passivation layer ($\in'$), and the thickness (d') of the passivation layer satisfy the relationship:

$$\in'/\in \cdot d > 0.1.$$

18. The device of claim 10, wherein the widths of the storage electrode and that of the storage conductor that overlap each other are the same.

* * * * *